United States Patent Office 3,828,055
Patented Aug. 6, 1974

3,828,055
HETEROCYCLIC AMIDES OF 4-HYDROXY-2H-1-BENZOTHIOPYRAN - 3 - CARBOXYLIC ACID 1,1-DIOXIDE
Harold Zinnes, Rockaway, and Neil A. Lindo, Chatham, N.J., assignors to Warner-Lambert Company, Morris Plains, N.J.
No Drawing. Continuation-in-part of application Ser. No. 248,509, Apr. 28, 1972, now Patent No. 3,769,292, dated Oct. 30, 1973. This application Feb. 20, 1973, Ser. No. 333,842
Int. Cl. C07d 31/50
U.S. Cl. 260—294.8 C                     6 Claims

ABSTRACT OF THE DISCLOSURE

Compounds of the formula:

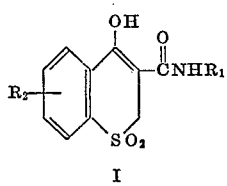

I wherein $R_1$ is an aromatic heterocyclic group and $R_2$ is hydrogen, alkyl, aralkyl, alkoxy, halogen, cyano, nitro, trifluoromethyl, etc., are disclosed. These compounds are useful as antiinflammatory agents.

CROSS-REFERENCE TO RELATED APPLICATION

This application is a continuation-in-part of our copending application, U.S. Ser. No. 248,509 filed Apr. 28, 1972, now U.S. Pat. No. 3,769,292 dated Oct. 30, 1973.

The present invention is concerned with novel heterocyclic amides of 4-hydroxy-2H-1-benzothiopyran-3-carboxylic acid 1,1-dioxide and the process for their production, having the following structural formula:

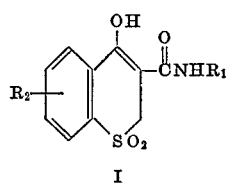

I wherein $R_1$ is an aromatic heterocyclic group, preferably pyridyl, thiazolyl, isoxazolyl, furyl, thienyl and the like and $R_2$ is hydrogen, lower alkyl, phenyl, benzyl, lower alkoxy, halogen, cyano, nitro, or trifluoromethyl and the like. The aromatic heterocyclic group may also be substituted by groups such as lower alkyl, phenyl, benzyl, lower alkoxy, halogen, cyano, nitro, trifluoromethyl and the like. The preferred substituted heterocyclic groups are 4-alkyl, 5-alkyl, 6-alkyl, 4-halo, or 4-nitro substituted pyridyl, alkyl substituted thiazole and isoxazole.

The present invention also encompasses within its scope a novel process for the production of the above compounds.

The compounds of this invention are useful as antiinflammatory agents. For example, when they are administered orally or intraperitoneally to laboratory animals such as rats, at a dose of 10–200 mg./kg., they reduce the swelling in the paw which had been previously induced by injection of an irritant such as carrageenin.

These compounds are indicated in conditions where the soft tissues are inflamed, such as rheumatoid arthritis in mammals. A dose of 10–200 mg./kg. in several divided doses daily, orally or by injection, is recommended.

This dose regimen may be varied depending on the weight, age, sex and the species of the mammal being treated.

In order to use these compounds, they are formulated with pharmaceutical diluents such as lactose and compounded into dosage forms such as tablets. Alternatively, they can be formulated with a sterile vehicle such as water for injection and compounded into suspensions suitable for parenteral administration. Since these compounds are acidic, they can be converted to metal or amine salts and the like. These salts are formed by conventional procedures, e.g., by treating the compound with an alkali such as sodium or potassium hydroxide and then recovering the salts. The pyridyl compounds are amphoteric. Thus, they can also form acid addition salts.

According to the present invention, the above compounds are prepared by subjecting a β-ketoester having the following structural formula to aminolysis:

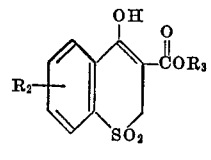

II wherein $R_3$ is aryl or alkyl. This process is desirably carried out by refluxing said compound II with an amine of the formula $R_1NH_2$ in an inert solvent such as xylene in the presence of a molecular sieve. The molecular sieve serves to remove the alcohol which is formed in the reaction.

The starting compound II is prepared in accordance with the description set forth in W. J. Still, et al., J. O. C., 33, 2730 (1968).

In the above definitions for $R_1$, $R_2$ and $R_3$ the term "alkyl" and the alkyl portions of "alkoxy" and "aralkyl" have 1 to 7 carbon atoms. The term "aryl" has 6 to 10 carbon atoms, such as phenyl or tolyl.

In order to further illustrate the practice of the invention, the following examples are included:

EXAMPLE 1

Heterocyclic amides of 4-hydroxy-2H-1-benzothiopyran-3-carboxylic acid 1,1-dioxide.—General procedure: A mixture of 8.1 g. (0.032 mol) of methyl 4-hydroxy-2H-1-benzothiopyran-3-carboxylate 1,1-dioxide, 0.05 mol of an appropriate heterocyclic amine, and 250 ml. of xylene was refluxed for 16 hrs. in a Soxhlet apparatus, the thimble of which contained 20 g. of Linde type 4A molecular sieve. The mixture was cooled to room temperature and the resulting crystalline precipitate was collected and recrystallized.

EXAMPLE 2

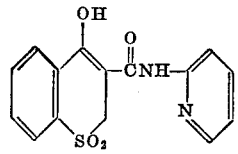

4 - hydroxy-N-(2 - pyridyl) - 2H - 1 - benzothiopyran-3 - carboxamide 1,1 - dioxide: A mixture of 9.4 g. (0.04 mole) of methyl 4-hydroxy-2H-1-benzothiopyran-3-carboxylate 1,1-dioxide, 5.2 g. (0.06 mole) of 2-aminopyridine, and 250 ml. of xylene was refluxed for 16 hrs. in a Soxhlet apparatus, the thimble of which contained 20 g. of Linde type 4A molecular sieve. The mixture was cooled to room temperature and the resulting crystalline precipitate (wgt. 8.6 g.; m.p. 236–238° dec.) was collected. It was recrystallized from acetic acid to give 6.4 g. of material, m.p. 236–238° dec.

*Analysis.*—Calcd. for $C_{15}H_{12}N_2O_4S$: C, 56.95; H, 3.82; N, 8.86; S, 10.14. Found: C, 56.70; H, 3.77; N, 8.73; S, 10.39.

EXAMPLE 3

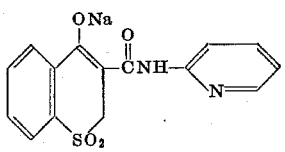

Sodium salt of 4-hydroxy-N-(2-pyridyl)-2H-1-benzothiopyran-3-carboxamide 1,1-dioxide: To a solution of 0.64 g. (0.016 mol) of sodium hydroxide in 30 ml. of methanol was added (all at once as the powder) 2.53 g. (0.008 mol) of 4 - hydroxy-N-(2 - pyridyl)-2H-1-benzothiopyran-3-carboxamide 1,1-dioxide and the mixture was stirred at room temperature for one hour. The resulting precipitate (2.6 g., m.p. 243° dec.) was recrystallized by dissolving in 150 ml. of ethanol and concentrating to a volume of 90 ml. The material obtained was dried *in vacuo* at 65° C. for 3 days to give 2.0 g. of product; m.p. 243–246° dec. (darkens at 220° C.).

*Analysis.*—Calcd. for $C_{15}H_{11}N_2O_4SNa \cdot \frac{1}{2}H_2O$: C, 51.86; H, 3.48; N, 8.07; S, 9.23; Na, 6.62. Found: C, 51.83; H, 3.49; N, 7.97; S, 9.21; Na, 6.49.

EXAMPLE 4

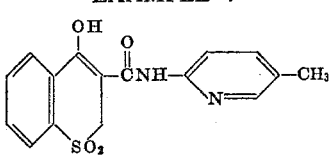

4 - hydroxy-N-(5 - methyl - 2 - pyridyl) - 2H - 1-benzothiopyran-3-carboxamide 1,1-dioxide: This product was obtained by using 2-amino-5-methylpyridine. It was recrystallized from acetic acid. Yield: 6.5 g.; m.p. 228° C.–229° C. dec.

*Analysis.*—Calcd. for $C_{16}H_{14}N_2O_4S$: C, 58.17; H, 4.27; N, 8.48; S, 9.71. Found: C, 58.12; H, 4.41; N, 8.35; S, 9.89.

EXAMPLE 5

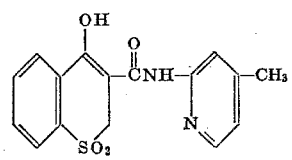

4 - hydroxy-N - (4 - methyl - 2 - pyridyl) - 2H - 1-benzothiopyran-3-carboxamide 1,1-dioxide: This product was obtained by using 2-amino-4-methylpyridine. It was recrystallized from acetic acid. Yield: 8.0 g.; m.p. 236° C.–238° C. dec.

*Analysis.*—Calcd. for $C_{16}H_{14}N_2O_4S$: S, 58.17; H, 4.27; N, 8.48; S, 9.71. Found: C, 58.20; H, 4.31; N, 8.32; S, 9.61.

EXAMPLE 6

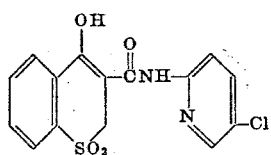

4 - hydroxy-N - (5 - chloro - 2 - pyridyl) - 2H - 1-benzothiopyran-3-carboxamide 1,1-dioxide: This was obtained by using 2-amino-5-chloropyridine. It was recrystallized from acetic acid. Yield: 7.3 g.; m.p. 196° C.–198° C. dec. (softens at 160° C.).

*Analysis.*—Calcd. for $C_{15}H_{11}ClN_2O_4S$: C, 51.36; H, 3.16; Cl, 10.11; N, 7.99; S, 9.14. Found: C, 51.12; H, 3.07; Cl, 10.04; N, 8.06; S, 9.00.

EXAMPLE 7

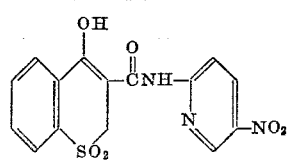

4 - hydroxy-N - (5 - nitro - 2 - pyridyl) - 2H - 1-benzothiopyran-3-carboxamide 1,1-dioxide: This was obtained by using 2-amino-5-nitropyridine. It was recrystallized from acetic acid. Yield: 4.5 g; m.p. 237° C.–239° C. dec.

*Analysis.*—Calcd. for $C_{15}H_{11}N_3O_6S$: C, 49.86; H, 3.07; N, 11.63; S, 8.87. Found: C, 50.08; H, 3.17; N, 11.56; S, 8.92.

EXAMPLE 8

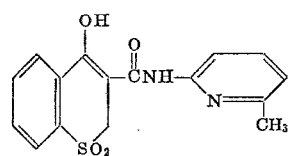

4 - hydroxy - N-(6-methyl-2-pyridyl)-2H-1-benzothiopyran-3-carboxamide 1,1-dioxide: This was obtained by using 2-amino-6-methylpyridine. It was recrystallized from 75 ml. of acetic acid. Yield: 8.0 g. (88%); m.p. 226.5° C.–228° C. dec.

*Analysis.*—Calcd. for $C_{16}H_{14}N_2O_4S$: C, 58.17; H, 4.27; N, 8.48; S, 9.71. Found: C, 57.97; H, 4.31; N, 8.29; S, 9.91.

EXAMPLE 9

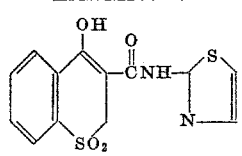

4 - hydroxy - N - (2-thiazolyl)-2H-1-benzothiopyran-3-carboxamide 1,1-dioxide: It was obtained by using 2-aminothiazole. It was recrystallized from 1900 ml. of acetic acid. Yield: 4.5 g.; m.p. 274° C.–277° C. dec.

*Analysis.*—Calcd. for $C_{13}H_{10}N_2O_4S_2$: C, 48.44; H, 3.13; N, 8.69; S, 19.89. Found: C, 48.27; H, 3.13; N, 8.69; S, 19.70.

EXAMPLE 10

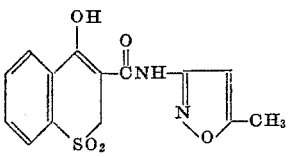

4 - hydroxy-N-(5-methyl-3-isoxazolyl)-2H-1-benzothiopyran-3-carboxamide 1,1-dioxide: This was obtained by using 3 - amino-5-methylisoxazole. It was recrystallized from 700 ml. of acetic acid. Yield: 7.8 g.; m.p. 244° C.–247° C, dec.

*Analysis.*—Calcd. for $C_{14}H_{12}N_2O_5S$: C, 52.50; H, 3.78; N, 8.75; S, 10.01. Found: C, 52.45; H, 3.80; N, 8.53; S, 10.18.

We claim:

1. A compound of the formula:

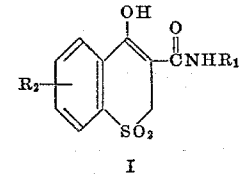

I wherein $R_1$ is pyridyl or substituted pyridyl and $R_2$ is lower alkyl, phenyl, benzyl, lower alkoxy, halogen, cyano, nitro or trifluoromethyl, and the salts pharmaceutically acceptable thereof.

2. A compound according to claim 1 which is 4-hydroxy - N-(5 - methyl-2-pyridyl)-2H-1-benzothiopyran-3-carboxamide 1,1-dioxide.

3. A compound according to claim 1 which is 4-hydroxy - N - (4-methyl-2-pyridyl)-2H-1-benzothiopyran-3-carboxamide 1,1-dioxide.

4. A compound according to claim 1 which is 4-hydroxy--N - (5 - chloro-2-pyridyl)-2H-1-benzothiopyran-3-carboxamide 1,1-dioxide.

5. A compound according to claim 1 which is 4-hydroxy - N - (5 - nitro-2-pyridyl)-2H-1-benzothiopyran-3-carboxamide 1,1-dioxide.

6. A compound according to claim 1 which is 4-hydroxy-N-(6-methyl-2-pyridyl)-2H-1-benzothiopyran-3-carboxamide 1,1-dioxide.

References Cited

UNITED STATES PATENTS

| | | |
|---|---|---|
| 3,133,918 | 5/1964 | MacPhillamy et al. _ 260—294.8 C |
| 3,163,645 | 12/1964 | De Stevens et al. __ 260—294.8 C |

ALAN L. ROTMAN, Primary Examiner

U.S. Cl. X.R.

260—306.8 R, 307 H, 327 TH; 424—266, 275, 270, 272